United States Patent
Zhong et al.

(10) Patent No.: US 10,151,882 B2
(45) Date of Patent: Dec. 11, 2018

(54) OPTICAL BEAM EXPANDING MODULE AND CONNECTOR

(71) Applicant: Tyco Electronics (Shanghai) Co. Ltd., Shanghai (CN)

(72) Inventors: Zhiyun Zhong, Shanghai (CN); Zhigang Song, Shanghai (CN); Haibo Zhang, Shanghai (CN); Jiahui Chen, Shanghai (CN); Jiangbo Qin, Shanghai (CN)

(73) Assignee: Tyco Electronics (Shanghai) Co. Ltd., Shanghai (CN)

( * ) Notice: Subject to any disclaimer, the term of this patent is extended or adjusted under 35 U.S.C. 154(b) by 0 days.

(21) Appl. No.: 15/674,056

(22) Filed: Aug. 10, 2017

(65) Prior Publication Data

US 2018/0045892 A1 Feb. 15, 2018

(30) Foreign Application Priority Data

Aug. 10, 2016 (CN) .......................... 2016 1 0651305

(51) Int. Cl.
  *G02B 6/32* (2006.01)
  *G02B 6/38* (2006.01)

(52) U.S. Cl.
  CPC ............. *G02B 6/32* (2013.01); *G02B 6/3821* (2013.01); *G02B 6/3857* (2013.01); *G02B 6/3874* (2013.01); *G02B 6/3887* (2013.01)

(58) Field of Classification Search
  CPC ...... G02B 6/32; G02B 6/3887; G02B 6/3874; G02B 6/3821; G02B 6/3857
  See application file for complete search history.

(56) References Cited

U.S. PATENT DOCUMENTS

| | | | |
|---|---|---|---|
| 4,889,399 A | * | 12/1989 | Mariani .................. G02B 6/32 385/35 |
| 7,722,261 B2 | | 5/2010 | Kadar-Kallen et al. |
| 8,511,909 B2 | | 8/2013 | Kadar-Kallen et al. |

* cited by examiner

*Primary Examiner* — Ryan Lepisto
(74) *Attorney, Agent, or Firm* — Barley Snyder

(57) ABSTRACT

An optical beam expanding module that has a housing, a ferrule mounted in the housing, a cable extending into the housing, an optical fiber of the cable being received in an inner bore of the ferrule; and an optical lens mounted in the housing at a front end surface of the ferrule for expanding the diameter of a light beam output from the optical fiber. The optical beam expanding module is adapted to be assembled as a single component in any one of assembly channels in mounting bodies of different connectors. There is provided a standardized optical beam expanding module being adapted to be applied to different beam expanding connectors.

17 Claims, 4 Drawing Sheets

OPTICAL BEAM EXPANDING MODULE AND CONNECTOR

CROSS-REFERENCE TO RELATED APPLICATION

This application claims the benefit of the filing date under 35 U.S.C. § 119(a)-(d) of Chinese Patent Application No. CN201610651305.8 filed on Aug. 10, 2016.

FIELD OF THE INVENTION

Embodiments of the present invention generally relate to an optical beam expanding module, a connector comprising the optical beam expanding module, and a connector assembly comprising the optical beam expanding module.

BACKGROUND

In the prior art, an optical beam expanding connector typically includes a mounting body and a plurality of beam expanding functional components. The mounting body is formed with a mounting hole in which the plurality of beam expanding functional components is mounted. Generally, the plurality of beam expanding functional components mainly includes a ferrule, an optical fiber, a lens, and a centering component. The optical fiber is accommodated in an inner hole of the ferrule. The ferrule is mounted in the mounting hole of the mounting body. The lens is mounted in the mounting hole of the mounting body and arranged at the front end face of the ferrule so as to expand the diameter of the light beam exited from the optical fiber. The centering component is mounted on the ferrule so as to align the axis of the ferrule with the axis of the mounting hole.

In the prior art, each beam expanding functional component of the optical beam expanding connector is mounted directly in the mounting hole of the mounting body of the connector. Thus, it is necessary that the internal structure of the mounting hole conform to the shape of each beam expanding functional component to be mounted.

At present, there is no uniform industry standard for design of the optical beam expanding connector. Therefore, internal structures of the mounting holes in different series of optical beam expanding connectors are usually different from each other. Therefore, it is necessary to separately design and manufacture beam expanding functional components that conform to the internal structure of the mounting holes and the beam expanding functional components of different series of optical beam expanding connectors are not interchangeable with each other. Thus, it is necessary to separately design and manufacture dedicated beam expanding functional components for different series of optical beam expanding connectors, which may waste much labor and material and lead to a long development cycle.

SUMMARY

In accordance with the present invention, an optical beam expanding module, adapted to be assembled as a single component in any one of assembly channels in mounting bodies of different connectors, includes a housing, a ferrule mounted in the housing and having an inner bore, a cable extending into the housing with an optical fiber of the cable received in the inner bore of the ferrule, and an optical lens mounted in the housing at a front end surface of the ferrule for expanding the diameter of a light beam emitted from the optical fiber.

BRIEF DESCRIPTION OF THE DRAWINGS

The above and other features of the present disclosure will be described with reference to the accompanying drawings, in which.

DETAILED DESCRIPTION OF THE PREFERRED EMBODIMENTS

Figure 1:
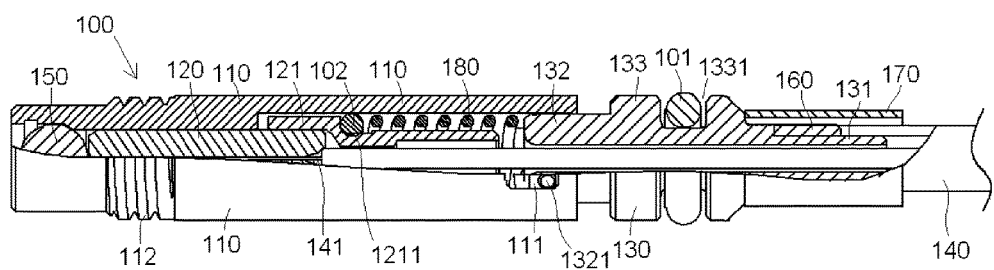
FIG. 1 shows an assembled optical beam expanding module according to an embodiment of the present invention.

The embodiments of the invention will be described in further detail in conjunction with the accompanying drawings. In the specification, the same or similar references indicate the same or similar components. The following description of embodiments of the present invention with reference to the accompanying drawings is intended to explain the general inventive concept of the present disclosure and should not be construed as limiting the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
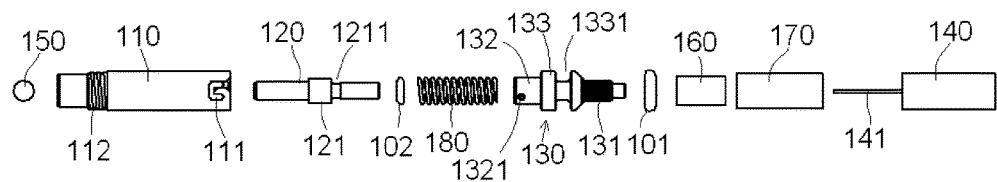
FIG. 2 is an exploded view of the optical beam expanding module of FIG. 1.

FIG. 1 shows an assembled optical beam expanding module 100 according to an embodiment of the present invention and FIG. 2 is an exploded view of the optical beam expanding module 100 of FIG. 1.

As shown in FIGS. 1 and 2, in the illustrated embodiment, the optical beam expanding module 100 mainly includes a housing 110, a ferrule 120, a cable 140, and an optical lens 150.

As shown in FIGS. 1 and 2, the ferrule 120 is mounted in the housing 110. The cable 140 extends into the housing 110, with an optical fiber 141 of the cable 140 being received in an inner bore of the ferrule 120. The optical lens 150 is mounted in the housing 110 at a front end surface of the ferrule 120 and constructed to expand the diameter of a light beam emitted from the optical fiber 141.

Figure 3:
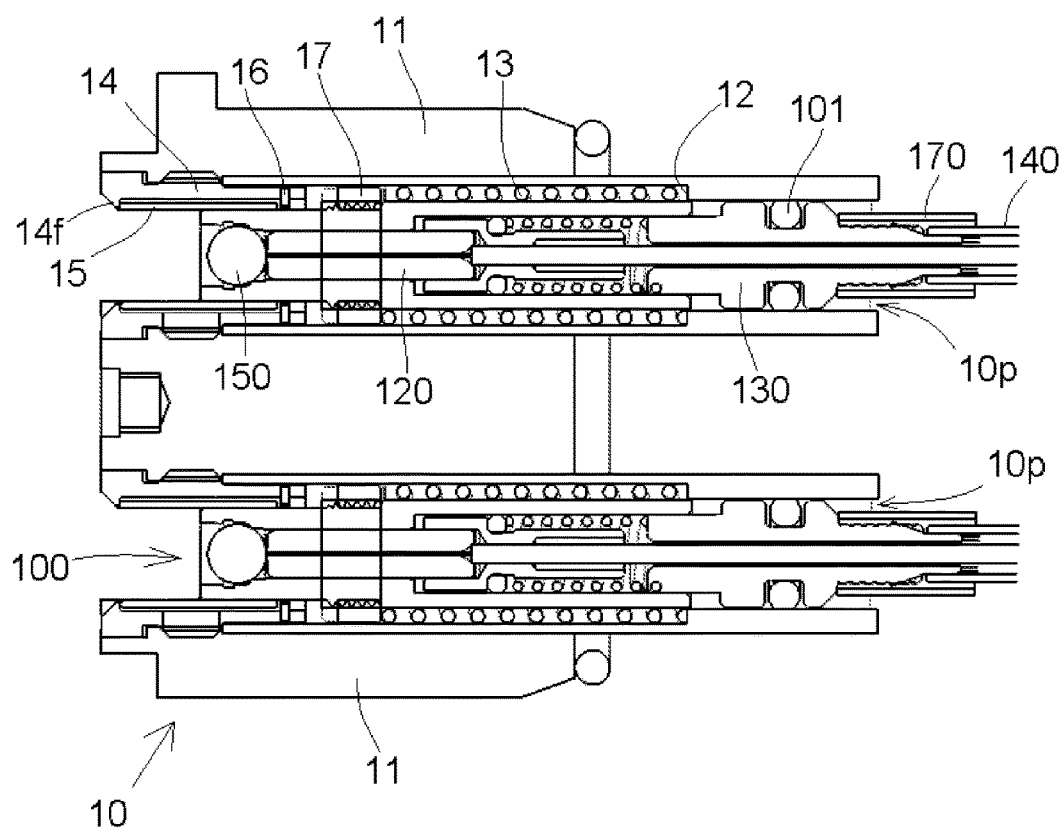
FIG. 3 is a cross-sectional view of a connector according to an embodiment of the present invention.
Figure 4:
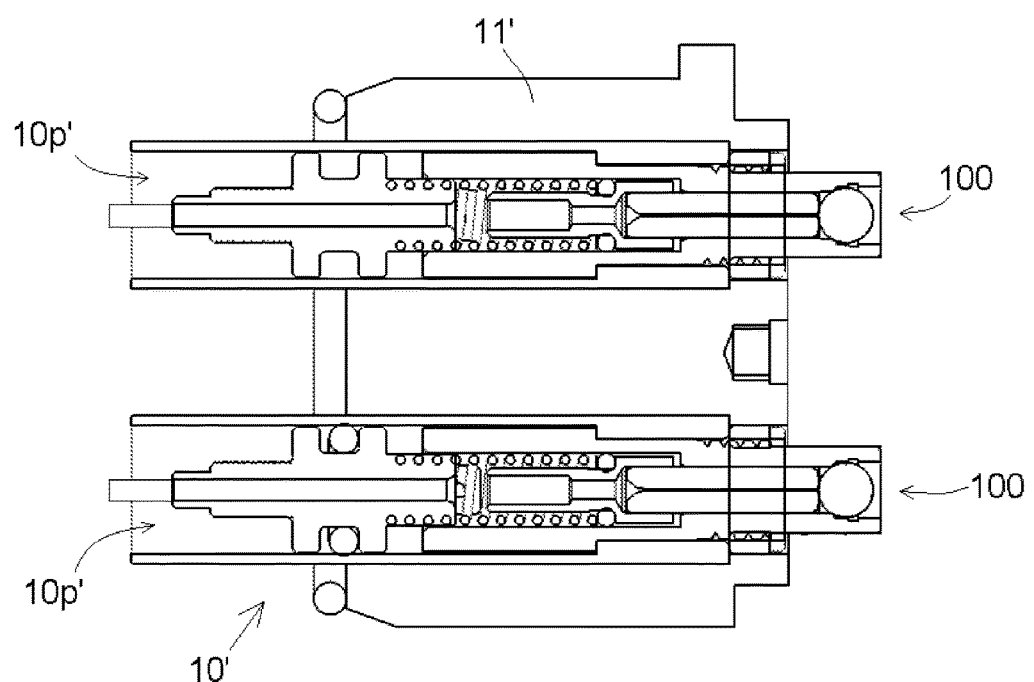
FIG. 4 is a cross-sectional view of a mating connector mated with the connector shown in FIG. 3 according to an embodiment of the present invention.
Figure 5:
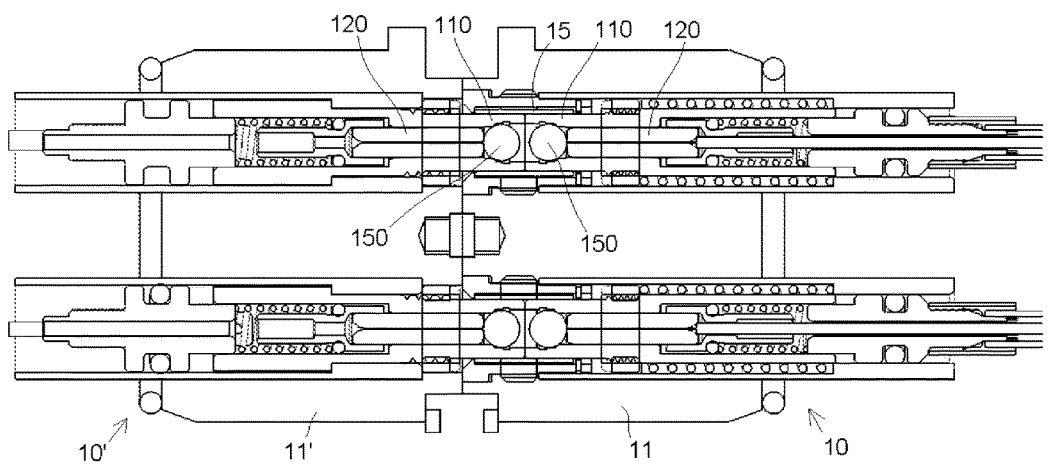
FIG. 5 shows the connector shown in FIG. 3 and the mating connector shown in FIG. 4 having been mated together.

As shown in FIGS. 1 and 2, in the illustrated embodiment, as a standardized functional module, the optical beam expanding module 100 is adapted to be assembled as a single component in any one of assembly channels 10$p$, 10$p'$ in mounting bodies 11, 11' of different connectors 10, 10' as shown in FIGS. 3-5.

As shown in FIGS. 3 and 4, in the illustrated embodiment, a plurality of assembly channels 10$p$, 10$p'$ are formed in the mounting body 11, 11' of each connector 10, 10' and each assembly channel 10$p$,10$p'$ or some of the assembly channels 10$p$,10$p'$ is assembled with the optical beam expanding module 100 shown in FIGS. 1 and 2. However, the present invention is not limited to the illustrated embodiment and the mounting body of each connector may be formed with a single assembly channel which is assembled with the optical beam expanding module 100 shown in FIGS. 1 and 2.

As shown in FIGS. 1 and 2, in the illustrated embodiment, the optical beam expanding module 100 further comprises a rear seat 130, of which a front end portion 132 is connected to the rear end of the housing 110. The cable 140 passes through the rear seat 130 and a strengthening element of the cable 140 is fixed on a rear end portion 131 of the rear seat 130.

As shown in FIGS. 1 and 2, in the illustrated embodiment, the front end portion 132 of the rear seat 130 is adapted to be snapped to or screwed to the rear end of the inner housing 110.

As shown in FIGS. 1 and 2, in the illustrated embodiment, a slot 111 is formed in one of the front end portion 132 of the rear seat 130 and the rear end of the housing 110 and a projection 1321, adapted to be snapped into the slot 111, is formed on the other. The rear seat 130 and the housing 110 are engaged with each other by snapping the projection 1321 into the slot 111.

As shown in FIGS. 1 and 2, in the illustrated embodiment, the optical beam expanding module 100 further comprises a crimp ring 160 fitted on the rear end portion 131 of the rear seat 130 and adapted to press the strengthening element (such as Kevlar fiber) of the cable 140 against the rear end portion 131 of the rear seat 130, so that the cable is fixed to the optical beam expanding module.

As shown in FIGS. 1, 2, and 3 in the illustrated embodiment, the optical beam expanding module 100 further comprises a first seal ring 101 fitted on the rear seat 130 and adapted to be pressed between an inner wall of the assembly channel 10p and an outer wall of the rear seat 130 for sealing a mating interface between the rear seat 130 and the assembly channel 10p.

As shown in FIGS. 1 and 2, in the illustrated embodiment, the rear seat 130 comprises a projection portion 133 located between the front end portion 132 and the rear end portion 131 thereof and a first circular groove 1331, in which the first sealing ring 101 is received, is formed in the projection portion 133.

As shown in FIGS. 1 and 2, in the illustrated embodiment, the optical beam expanding module 100 further comprises a second seal ring 102 fitted on the ferrule 120 and adapted to be pressed between an inner wall of the housing 110 and an outer wall of the ferrule 120 for sealing a mating interface between the housing 110 and the ferrule 120.

As shown in FIGS. 1 and 2, in the illustrated embodiment, a second circular groove 1211 is formed on a rear seat 121 of the ferrule 120 to receive the second seal ring 102 therein.

As shown in FIGS. 1 and 2, in the illustrated embodiment, the optical beam expanding module 100 further comprises a spring 180 received in the housing 110 and compressed between the rear seat 130 and the ferrule 120 to apply an axial thrust to the ferrule 120 such that the front end face of the ferrule 120 is pushed against the optical lens 150.

As shown in FIGS. 1 and 2, in the illustrated embodiment, the optical lens 150 comprises a spherical optical lens.

As shown in FIGS. 1 and 2, in the illustrated embodiment, the optical beam expanding module 100 further comprises a thermal shrinkable tube 170 thermally shrunk onto the rear end portion 131 of the rear seat 130 and the cable 140.

FIG. 3 is a cross-sectional view of a connector 10 according to an embodiment of the present invention.

As shown in FIG. 3, in the illustrated embodiment of the present invention, the connector 10 comprises a mounting body 11 and the optical beam expanding module 100 shown in FIGS. 1 and 2.

As shown in FIG. 3, in the illustrated embodiment of the present invention, the mounting body 11 is formed with an assembly channel 10p and the optical beam expanding module 100, shown in FIGS. 1 and 2, is assembled in the assembly channel 10p of the mounting body 11.

As shown in FIGS. 1, 2, and 3, in the illustrated embodiment of the present invention, an outer thread 112 is formed on an outer wall of a front end portion of the housing 110 and the connector 10 further comprises a fastener, such as a first nut 17 adapted to be threaded onto the outer thread 112 of the housing 110.

As shown in FIGS. 1, 2, and 3, in the illustrated embodiment of the present invention, a positioning step 12 is formed on the inner wall of the assembly channel 10p and the connector comprises a second spring 13 fit on the housing 110 and adapted to be compressed between the first nut 17 and the positioning step 12 to apply an axial thrust to the housing 110, such that the front end face of the housing 110 in the connector 10 abuts against a front end face of a housing 110 in a mating connector 10'.

As shown in FIGS. 1, 2, and 3, in the illustrated embodiment of the present invention, the connector further comprises an alignment sleeve 15 received in the assembly channel 10p. As shown in FIG. 5, in the illustrated embodiment of the present invention, the front end portion of the housing 110 of the optical beam expanding module 100 in the connector 10 and the front end portion of the housing 110 in the mating connector 10' are adapted to be inserted into the alignment sleeve 15 from both ends of the alignment sleeve 15, respectively, such that the ferrule 120 in the connector 10 is axially aligned with the ferrule 120 in the mating connector 10'.

As shown in FIGS. 1, 2, and 3, in the illustrated embodiment of the present invention, the connector further comprises a second nut 14 screwed to an inner wall of the assembly channel 10p. A C-shaped snap ring 16 is provided on the inner end of the second nut 14, a positioning lip 14f projecting inwardly is formed on the outer end of the second nut 14, and the alignment sleeve 15 is positioned between the C-shaped snap ring 16 and the positioning lip 14f.

FIG. 4 is a cross-sectional view of a mating connector 10' mated with the connector 10 shown in FIG. 3 according to an embodiment of the present invention and FIG. 5 shows the connector 10, shown in FIG. 3, and the mating connector 10', shown in FIG. 4, having been mated together.

As shown in FIG. 4, in the illustrated embodiment of the present invention, the mating connector 10' comprises a mounting body 11' and the optical beam expanding module 100 shown in FIGS. 1 and 2, which is assembled in an assembly channel 10p' of the mounting body 11' of the mating connector 10'.

It should be noted that the optical beam expanding module 100 in the mating connector 10' shown in FIG. 4 is identical to the optical beam expanding module 100 in the connector 10 shown in FIG. 3. That is, as a standardized functional module, the optical beam expanding module 100 shown in FIGS. 1 and 2 is adapted to be assembled into the assembly channels 10p, 10p' of the mounting bodies 11, 11' of different connectors 10, 10'.

As shown in FIG. 5, in another embodiment of the present invention, there is also provided a connector assembly, comprising the connector 10 shown in FIG. 3 and the mating connector 10' shown in FIG. 4.

As clearly shown in FIG. 5, in the illustrated embodiment of the present invention, when the connector 10 shown in FIG. 3 and the mating connector 10' shown in FIG. 4 are mated together, the optical lens 150 of the connector 10 shown in FIG. 3 and the optical lens 150 of the mating connector 10' shown in FIG. 4 are spaced apart by a predetermined distance.

In the above various exemplary embodiments of the present disclosure, there is provided a standardized optical beam expanding module. The standardized optical beam expanding module is adapted to be applied to different beam expanding connectors. This greatly reduces the development cost and greatly shortens the development cycle of the beam expanding connector.

It should be appreciated by those skilled in this art that the above embodiments are intended to be illustrative. Many modifications may be made to the above embodiments by those skilled in this art and various features described in different embodiments may be freely combined with each other without conflicting in configuration or principle to realize a variety of connection terminals and electrical connectors on the basis that the technical problems of the present disclosure are solved.

Although the present disclosure has been described with reference to the accompanying drawings, the embodiments disclosed in the drawings are intended to be illustrative of the preferred embodiments of the invention and are not to be construed as limiting the invention.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

It should be noted that the terms "comprises" and/or "comprising" in this specification do not exclude other elements or steps and the singular forms "a", "an" and "the" are intended to include the plural forms as well. In addition, any reference number in the claims should not be appreciated as limitation to the scope of the present disclosure.

What is claimed is:

1. An optical beam expanding module adapted to be assembled as a single component in any one of assembly channels in mounting bodies of different connectors, the optical beam expanding module comprising:
   a housing;
   a ferrule mounted in the housing and having an inner bore;
   a cable extending into the housing with an optical fiber of the cable received in the inner bore of the ferrule;
   an optical lens mounted in the housing at a front end surface of the ferrule for expanding the diameter of a light beam emitted from the optical fiber; and
   a rear seat having a front end portion connected to the rear end of the housing, the cable has a strengthening element fixed on a rear end portion of the rear seat and the cable passes through the rear seat and the strengthening element.

2. The optical beam expanding module according to claim 1, wherein the front end portion of the rear seat is adapted to be fastened to the rear end of the housing.

3. The optical beam expanding module according to claim 2, wherein:
   (a) one of the front end portion of the rear seat and the rear end of the housing has a slot; and
   (b) the other of the front end portion of the rear seat and the rear end of the housing has a projection snapped into the slot.

4. The optical beam expanding module according to claim 3, further comprising a crimp ring pressing the strengthening element of the cable against the rear end portion of the rear seat.

5. The optical beam expanding module according to claim 4, wherein the rear seat comprises a projection portion between the front end portion and the rear end portion and having a first circular groove in which the first sealing ring is received.

6. The optical beam expanding module according to claim 5, further comprising a second seal ring pressed between an inner wall of the housing and an outer wall of the ferrule for sealing a mating interface between the housing and the ferrule.

7. The optical beam expanding module 4, wherein one or more assembly channels are formed in the mounting body of each connector, with each assembly channel or some of the assembly channels being assembled with the optical beam expanding module.

8. The optical beam expanding module according to claim 7, further comprising a first seal ring pressed between an inner wall of the assembly channel and an outer wall of the rear seat for sealing a mating interface between the rear seat and the assembly channel.

9. The optical beam expanding module according to claim 2, further comprising a spring received in the housing and compressed between the rear seat and the ferrule to apply an axial thrust to the ferrule such that the front end face of the ferrule is pushed against the optical lens.

10. The optical beam expanding module according to claim 9, wherein a rear seat of the ferrule has a second circular groove in which the second seal ring is received.

11. The optical beam expanding module according to claim 2, further comprising a thermal shrinkable tube thermally shrunk onto the rear end portion of the rear seat and the cable.

12. The optical beam expanding module according to claim 1, wherein the optical lens comprises a spherical optical lens.

13. A connector, comprising:
   a mounting body having an assembly channel, an inner wall of the assembly channel having a positioning step;
   an optical beam expanding module in the assembly channel of the mounting body and comprising:
   (a) a housing, an outer wall of a front end portion of the housing has an outer thread;
   (b) a ferrule having an inner bore mounted in the housing;
   (c) a cable extending into the housing with an optical fiber of the cable received in the inner bore of the ferrule; and
   (d) an optical lens mounted in the housing at a front end surface of the ferrule for expanding the diameter of a light beam emitted from the optical fiber;
   a first nut threaded onto the outer thread of the housing; and
   a spring fit on the housing and compressed between the first nut and the positioning step to apply an axial thrust to the housing, such that the front end face of the housing in the connector abuts against a front end face of a housing in a mating connector.

14. The connector according to claim 13:
   (a) further comprising an alignment sleeve received in the assembly channel, and
   (b) wherein the front end portion of the housing of the optical beam expanding module in the connector and the front end portion of the housing in the mating connector are inserted into the alignment sleeve from both ends of the alignment sleeve respectively, such that the ferrule in the connector is axially aligned with a ferrule in the mating connector.

15. The connector according to claim 14:
(a) further comprising:
   (1) a second nut screwed to an inner wall of the assembly channel;
   (2) a C-shaped snap ring on an inner end of the second nut, and
   (3) a positioning lip projecting inwardly on an outer end of the second nut, and
(b) wherein the alignment sleeve is between the C-shaped snap ring and the positioning lip.

16. A mating connector mated with the connector according to claim 13, comprising:
a mounting body having an assembly channel; and
an optical beam expanding module in the assembly channel of the mounting body of the mating connector and comprising:
   (a) a housing;
   (b) a ferrule mounted in the housing and having an inner bore;
   (c) a cable extending into the housing with an optical fiber of the cable received in the inner bore of the ferrule; and
   (d) an optical lens mounted in the housing at a front end surface of the ferrule for expanding the diameter of a light beam emitted from the optical fiber.

17. The mating connector mated with the connector according to claim 16, wherein the optical beam expanding module in the mating connector is identical to the optical beam expanding module in the connector.

* * * * *